US007475055B2

(12) United States Patent
Hutchison et al.

(10) Patent No.: US 7,475,055 B2
(45) Date of Patent: Jan. 6, 2009

(54) METHOD FOR EXECUTING A DATABASE QUERY

(75) Inventors: Grant L. Hutchison, Toronto (CA); Acie E. Nobles, Jr., Plano, TX (US); Pucheng Zeng, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 10/759,154

(22) Filed: Jan. 20, 2004

(65) Prior Publication Data

US 2004/0205057 A1    Oct. 14, 2004

(30) Foreign Application Priority Data

Apr. 8, 2003    (CA)    ................................ 2425045

(51) Int. Cl.
*G06F 7/00* (2006.01)
(52) U.S. Cl. .................................... 707/2; 707/3; 707/9
(58) Field of Classification Search ........... 707/1–104.1
See application file for complete search history.

(56) References Cited

U.S. PATENT DOCUMENTS

| | | | | |
|---|---|---|---|---|
| 5,625,815 A | * | 4/1997 | Maier et al. ..................... 707/8 |
| 5,659,701 A | * | 8/1997 | Amit et al. ................... 719/317 |
| 5,692,129 A | * | 11/1997 | Sonderegger et al. ... 707/103 R |
| 5,835,755 A | | 11/1998 | Stellwagen, Jr. |
| 5,860,070 A | * | 1/1999 | Tow et al. ....................... 707/8 |
| 6,012,067 A | | 1/2000 | Sarkar |
| 6,078,924 A | * | 6/2000 | Ainsbury et al. ............. 707/101 |
| 6,105,026 A | * | 8/2000 | Kruglikov et al. ............... 707/8 |
| 6,157,925 A | * | 12/2000 | Jenkins et al. ................. 707/10 |
| 6,289,334 B1 | * | 9/2001 | Reiner et al. .................... 707/3 |
| 6,732,100 B1 | * | 5/2004 | Brodersen et al. .............. 707/9 |
| 6,816,853 B1 | * | 11/2004 | Agarwal et al. ................. 707/3 |
| 6,931,390 B1 | * | 8/2005 | Zait et al. ....................... 707/2 |
| 6,957,225 B1 | * | 10/2005 | Zait et al. .................... 707/102 |
| 2002/0029163 A1 | * | 3/2002 | Joao ............................ 705/12 |
| 2002/0087510 A1 | * | 7/2002 | Weinberg et al. .............. 707/1 |
| 2002/0099818 A1 | * | 7/2002 | Russell et al. ................ 709/224 |
| 2002/0123978 A1 | * | 9/2002 | Bird et al. ....................... 707/1 |
| 2003/0061330 A1 | * | 3/2003 | Frisco et al. ................. 709/223 |
| 2003/0233347 A1 | * | 12/2003 | Weinberg et al. .............. 707/3 |
| 2004/0133640 A1 | * | 7/2004 | Yeager et al. ................ 709/204 |

FOREIGN PATENT DOCUMENTS

WO    WO 01/63521 A2    8/2001

\* cited by examiner

*Primary Examiner*—Linh Black
(74) *Attorney, Agent, or Firm*—Gregory M. Plow; SVL, IP Law

(57) ABSTRACT

For a database management system installed in a data processing system, the database management system for managing a database having partitions for storing table data based on a partitioning schema, in which each partition has an associated partition identifier, and in which the database has database catalog information associated therewith, a method for executing a query against the database is disclosed. The method includes identifying a partition identifier in accordance with the partitioning schema, selecting the partition identifier based on the contents of the query and the database catalog information, and executing the query against the identified partition. The method improves the execution of queries while minimizing the consumption of network resources.

3 Claims, 5 Drawing Sheets

METHOD FOR EXECUTING A DATABASE QUERY

FIELD OF THE INVENTION

The present invention generally relates to database management systems; and more particularly, the present invention relates to a method and system for directing a database management system to execute a database query against a partitioned database.

BACKGROUND OF THE INVENTION

With the proliferation of large transactional systems has come the need to rapidly access and store large volumes of database information. The need for efficient management of large volumes of information is further exacerbated by the exponential growth of the Internet and the plurality of end-users accessing data stored in large databases (an example of which is data stored in the World Wide Web).

Due to their ease of scalability and reduced processing overhead, databases are preferably implemented based on the relational database architecture. In a relational database, data and relationships are represented by a collection of tables in which each table is associated with a unique name or unique identifier. A row in a table represents the relationship among a set of data stored in the table. The storage representation of a row is called a record, and the storage representation of a column is called a field. Data is translated into a sequence of bytes and is then stored at the intersection of a row and a column of a table.

As the size of the stored data increases, the table is divided into partitions. In a multicomputer structure having an array of processors adapted to operate with shared memory systems, each partition of the table may be independently stored in non-contiguous memory locations thereby allowing pipelining and bulk parallel processing of the database information. Table partitions are managed independently by the Post-Relational Database Management System (PRDBMS) but the table data access remains unaffected.

Several known schemas exist for distributing data across partitions in memory systems. These partitioning schemas (also known as strategies) are tightly coupled with the physical implementation of the data model for the database system. One popular partitioning scheme uses a randomizing hashing function to horizontally or vertically partition the contents of a database (or of the table) across different memory systems. The database or the table may also be partitioned based on information not stored in the database, such information may include—for example—the site where the data was inserted, the user who inserted the data, and/or the application used to insert the data into the database.

Regardless of the known partitioning scheme used, large databases storing vast amounts of information present a challenge for efficient access and management of data located across many partitions.

Known PRDBMSs manage data that has been distributed across multiple partitions associated with database(s) and communicate this data to the end users. PRDBMSs consist of a collection of executable programs that enables users to access, modify, store or retrieve data associated with the database. Over the years, the Structured Query Language (SQL) interface—initially developed by IBM—has evolved to become the de facto database query language for accessing and modifying data stored in relational databases. The SQL interface facilitates database queries by building an index file which is associated with the stored data (in addition to storing the data in a data file related to the database). Database applications may access the entire contents of the database by submitting standard SQL query statements to the PRDBMS, and in turn, the PRDBMS compiles and executes those SQL queries against the database.

To efficiently access databases containing massive amounts of data, the PRDBMS must work with many different types of SQL query statements (such as SELECT, INSERT, UPDATE, DELETE, etc). To access data stored in partitioned relational databases, the PRDBMS must establish both a physical and a logical connection to the database partition where that data resides. The PRDBMS typically uses a database name and a server port to establish the physical connection to the database partition. To establish a logical connection, the PRDBMS resorts to using an index that is an ordered set of references to the records and fields in the table of that database. The index provides a direct path to the stored data through pointers that have been ordered based on keys associated with the index. A key is one of the fields of the record or one of the columns of a row. The keys may be organized into a partition map by a mapping function such as a hash function.

To retrieve and access data contained within a particular partition, the PRDBMS uses the supplied query predicates within an SQL statement to determine the optimal data access strategy. However, this process may become inefficient when managing massive amounts of stored data. Furthermore, large amounts of data typically must be first split before the split data can be loaded at desired database partition(s). This is commonly achieved by an application utility program provided by the PRDBMS, such as an AutoLoader utility program provided by the IBM DB2 database environment. The AutoLoader utility uses a hashing algorithm to split data into as many output sockets as there are database partitions. This utility then loads the output sockets across a set of database partitions. Data splitting may become overwhelming for utility programs when dealing with massive quantities of data.

Based on the foregoing, it is appreciated that data loading and access in PRDBMSs consumes a considerable amount of CPU, network, memory, and storage resources. Network resources can become a significant component of the overall SQL query statement processing costs for the PRDBMS. Although data can be managed in a parallel fashion, each partition in a partitioned database environment still requires a SQL query statement processing agent commonly referred to as the coordinator for executing an SQL query statement. Additional communication costs are incurred when the required data is not collocated with this coordinator. Network resources can be eliminated from SQL statement processing when the required data is collocated with the coordinator. Minimizing network resources may be a critical factor for scaling high volume transactional processing systems.

Another shortcoming especially encountered in legacy PRDBMSs is the lack of any optimization while executing database queries. High-level SQL queries are generally non-procedural in nature. When a query is presented to a legacy PRDBMS system, the query indicates what type of action to perform as opposed to how to go about performing the type of action (as set forth in the SQL query statement). Accordingly, data accessing in large partitioned databases may become unmanageable. Accordingly, a solution that addresses, at least in part, this and other shortcomings is desired.

SUMMARY OF THE INVENTION

The present invention provides, for a database management system installed in a data processing system, in which the database management system manages a database having partitions for storing table data based on a partitioning schema, in which each partition has an associated partition identifier, in which the database has database catalog information associated therewith, a method for executing a query against the database which improves the execution of queries while minimizing the consumption of network resources.

In a first aspect, the present invention provides, for a database management system installed in a data processing system, the database management system for managing a database having partitions for storing table data based on a partitioning schema, each partition having an associated partition identifier, the database having database catalog information associated therewith, a method for executing a query against the database, including identifying a partition identifier in accordance with the partitioning schema, selecting the partition identifier based on the contents of the query and the database catalog information, and executing the query against the identified partition.

In another aspect, the present invention provides a database management system, the database management system for managing a database having partitions for storing table data based on a partitioning schema, each partition having an associated partition identifier, the database having database catalog information associated therewith, the database management system for executing a query against the database, the database management system including a module for identifying a partition identifier in accordance with the partitioning schema, a module for selecting the partition identifier based on the contents of the query and the database catalog information, and a module for executing the query against the identified partition.

In yet another aspect, the present invention provides a computer program product having a computer readable medium tangibly embodying computer executable code for directing a database management system, the database management system for managing a database having partitions for storing table data based on a partitioning schema, each partition having an associated partition identifier, the database having database catalog information associated therewith, the database management system for executing a query against the database, the computer program product including code for identifying a partition identifier in accordance with the partitioning schema, code for selecting the partition identifier based on the contents of the query and the database catalog information, and code for executing the query against the identified partition.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

A better understanding of these and other embodiments of the present invention can be obtained with reference to the following drawings which show, by way of example, embodiments of the present invention.

DETAILED DESCRIPTION OF THE PREFERRED EMBODIMENTS

Figure 1:
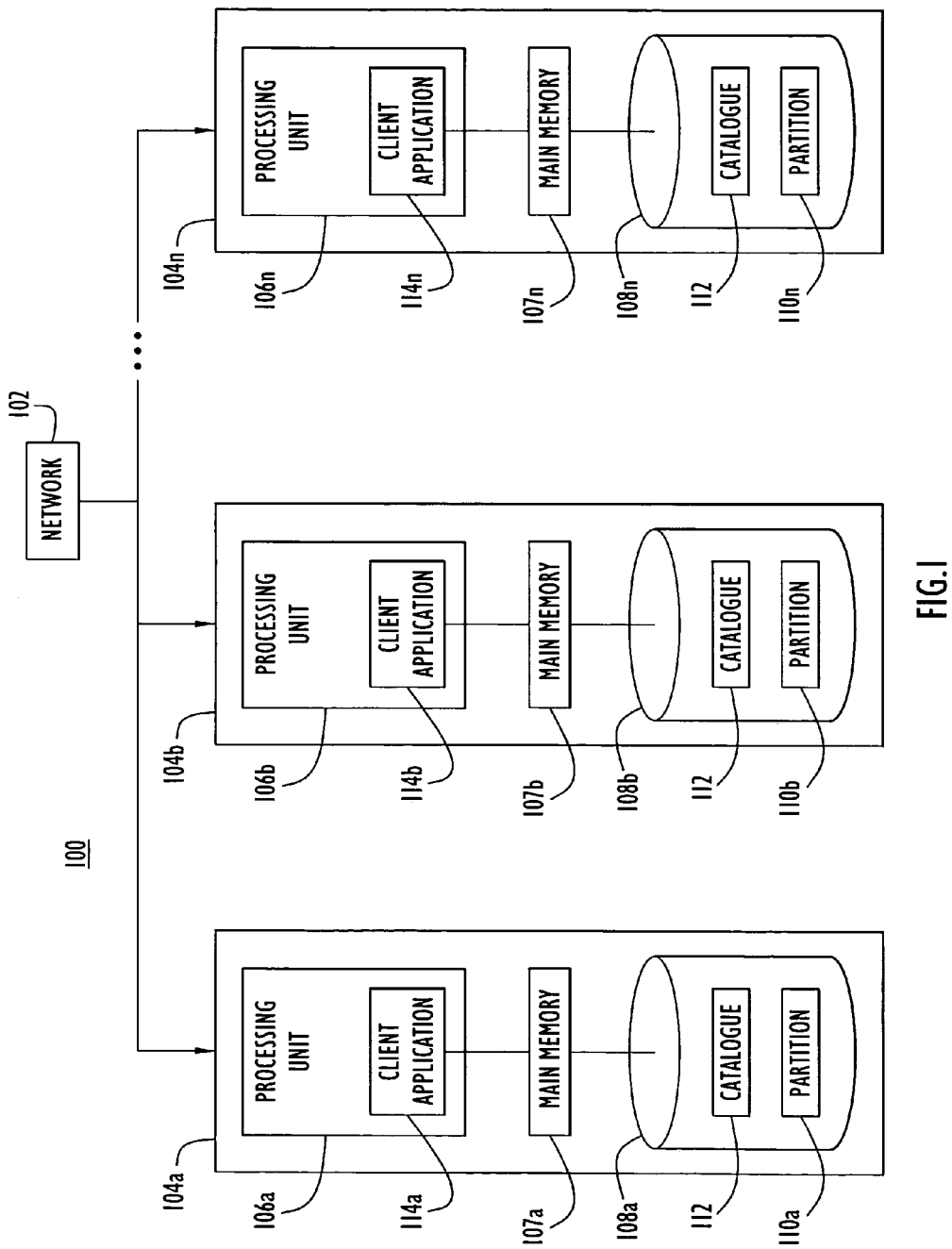
FIG. 1 is a schematic diagram of an exemplary data processing network in which the present invention may be practiced.

The embodiments of the present invention provide a method, a data processing system, a computer program product, and/or an article for implementing a database management system which manages a database having partitions for storing table data based on a partitioning schema, in which each partition has an associated partition identifier and the database has a database catalog information indicating data organization in the database.

It will also be appreciated, by those skilled in the art, that the computer program product includes a computer readable medium having computer executable code for directing a data processing system to implement the method. The computer program product can also be called a computer-readable memory, in which the memory can be a CD, floppy disk or hard drive or any sort of memory device usable by a data processing system. It will also be appreciated, by those skilled in the art, that a data processing system may be configured to operate the method (either by use of computer executable code or software modules residing in a medium or by use of dedicated hardware modules which may operate in an equivalent manner to the executable code or software modules which is well known in the art).

The present invention is now described with reference to accompanying drawings, wherein like elements are designated by like reference numerals throughout the drawings. Although the embodiments of the present invention are primarily presented in the context of the IBM DB2 database systems, they may be implemented in any number of other database management systems.

Reference is now made to FIG. 1 which conceptually illustrates an exemplary data processing network 100 adaptable to the present invention and in which the present invention may be practiced. The data processing network 100 of FIG. 1 includes a communication network 102 having a number of interconnected processing nodes 104a-104n. Each processing node 104a-104n comprises at least a processing unit 106a-106n, an operating main memory 107a-107n, such as random access memory (RAM) or read only memory (ROM), and a storage device 108a-108n, such as a disk drive for storing data, such as table data. The storage devices 108a-108n may also comprise, for each processing unit 106a-106n, respective private external storage (not shown).

In a partitioned relational database environment, respective partitions 110a-110n of a database are stored in the storage devices 108a-108n. As a result, table data is distributed and stored across multiple processing nodes 104a-104n in partitions 110a-110n or a subset thereof by known techniques. A database catalog 112 maintains a record of the partitions 110a-110n in which table data is located in a partition map. The database catalog 112 is created by known methods when a partition 110a-110n is initialized and remains constantly updated and active until the processing node 104a-104n is shut down. In the preferred embodiments of the present invention, the catalog 112 is accessible at all processing nodes 104a-104n of the data processing network 100.

Each processing unit 106a-106n in the data processing network 100 performs database-related access and management transactions (such as SQL statements) by executing instructions stored in its operating main memory 107a-107n. Without limitation, the processing units 104a-104n may comprise instructions executing on one or more computer systems, respective processor units of a multi-processor system, servers, or separate computer systems.

User interaction generally occurs through one processing node 104a-104n, known as the coordinator node for that user or client application 114a-114n. Any processing node 104a-104n can be used as a coordinator node. The coordinator node is a processing node 104a-104n and can be chosen at different processing nodes 104a-104n for different database transactions. This means that the term coordinator node is relative per processing node 104a-104n and can be any node. Typically, a client application 114a-114n running on a processing unit 106a-106n of the coordinator node serves as an interface to a user at that coordinator node for communicating the instructions to the main operating memory 107a-107n, the storage devices 108a-108n, or the private external storages. In this fashion, the instructions necessary for performing various database search and retrieval functions can be embodied in a computer program product executable by the processing units 104a-104n.

Figure 2:
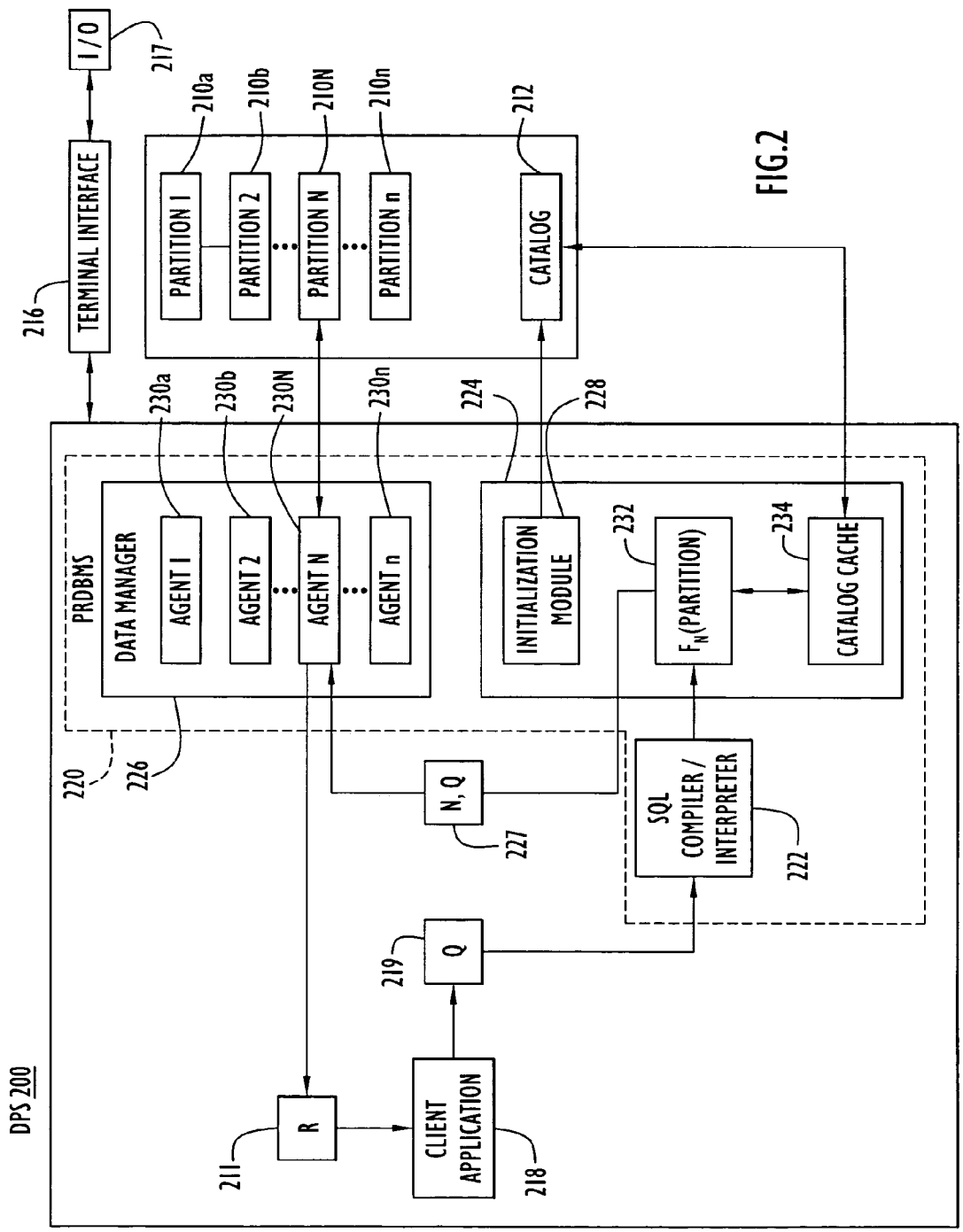
FIG. 2 is a block diagram of a data processing system at a processing node of the data processing network of FIG. 1 that implements the PRDBMS according to a preferred embodiment of the present invention.

Referring now to FIG. 2, there is shown a computer environment at a node 104a-104n of FIG. 1 in accordance with a preferred embodiment of the present invention. In the computer environment of FIG. 2, a data processing system 200 at the node accesses partitions 210a-210n, in which table data is stored. A user of the data processing system 200 uses a standard terminal interface 216, such as one of the interfaces known as Windows 2000, OS/2, Unix, Linux or the like to interface with an I/O device 217 such as a keyboard, a pointing device, or a display. The I/O device 217 allows the user to communicate electrical signals representing commands for performing various database transactions against the partitions 210a-210n. These search and retrieval transactions are generally referred to as queries. In the presently described preferred embodiment of the invention, these queries conform to the SQL standard and invoke functions performed by a PRDBMS software. In the preferred embodiment of the present invention, the PRDBMS software comprises the DB2 offered by the IBM corporation for the Windows 2000, OS/2, Unix or Linux operating systems. Such software generally resides in the storage devices, the main operating memory or the private external storages (not shown) of the data processing system 200.

At the heart of the data processing system 200 of FIG. 2 is a PRDBMS module 220. The PRDBMS module 220 typically includes several submodules, such as a SQL compiler/interpreter 222 for communicating a SQL query 219 from a client application 218, a partition router 224, and a data manager 226 having a number of agents 230a-230n corresponding to partitions 210a-210n respectively.

A coordinator agent can be chosen amongst any of the agents 230a-230n and is responsible for processing a database transaction (unit of work) for a particular SQL instruction 219 from the client application 218. A coordinator agent 230a-230n is usually chosen for a partition 210a-210n having the first available port for establishing a physical connection. Any database partition 210a-210n can be associated with a coordinator agent. The coordinator agent 230a-230n may also be by default located in a specific partition 210a-210n. The coordinator agent typically runs on the same database partition as the database application 218, or in the case of a remote application (note shown), the partition 210a-210n to which that remote application is connected.

The partition router 224 may be implemented as a software entity and comprises an initialization module 228, a partition router function 232, as well as a database catalog cache 234 for the partitions 210a-210n.

As a first step, the SQL statement 219 including a target table name and partition key value for the desired data is sent to the SQL compiler/interpreter 222 that parses the SQL statement 219 into executable instructions passed to the partition router 224. The partition router 224 is responsible for automatically routing and executing the SQL statements for the appropriate database partition 210a-210n to access or locate desired data. The selection of the database partition 210a-210n in which the desired table data resides is based on the following parameters: (1) the contents of the SQL statement; (2) the database catalog information contained in the catalog cache 212; and (3) the partition router function 232.

Caching a subset of the database catalog 212 within the partition router 224 is an efficient way for providing the requisite database catalog information on-the-fly. The database catalog 212 typically includes a set of partition maps wherein the partitions 210a-210n corresponding to all table data is stored. For instance, data for table t1 may be located in partitions 210a and 210b. Accordingly, in a partition map there is contained information that can be used to determine in which partition 210a-210n table data for table t1 can be located. When accessing table t1 data, the initialization module 228 initializes the catalog 212, and builds and loads a subset of the catalog 212 into the catalog cache 234 prior to issuing any SQL statements for the PRDBMS using the partition router 224. By caching the subset of the database catalog 212, the partition router 224 can reduce network resource requirements. The SQL statement and accompanying key value can then be used to determine the most appropriate coordinator agent 230a-230n to process the SQL query.

As with most known caching techniques, the catalog cache 234 needs to be refreshed when the database catalog information is modified. Accordingly, the initialization module 228 may be run when a new partition map is defined or new or existing tables are associated with partition maps. In a preferred embodiment of the present invention, the initialization module 228 further loads into the catalog cache 234 other partitioning parameters, such as the name of the partition 210a-210n, the path for the processing node of the partition 210a-210n, or other database idiosyncrasies or a description of the partition 210a-210n which may enhance the performance of the PRDBMS module 220.

Figure 3:
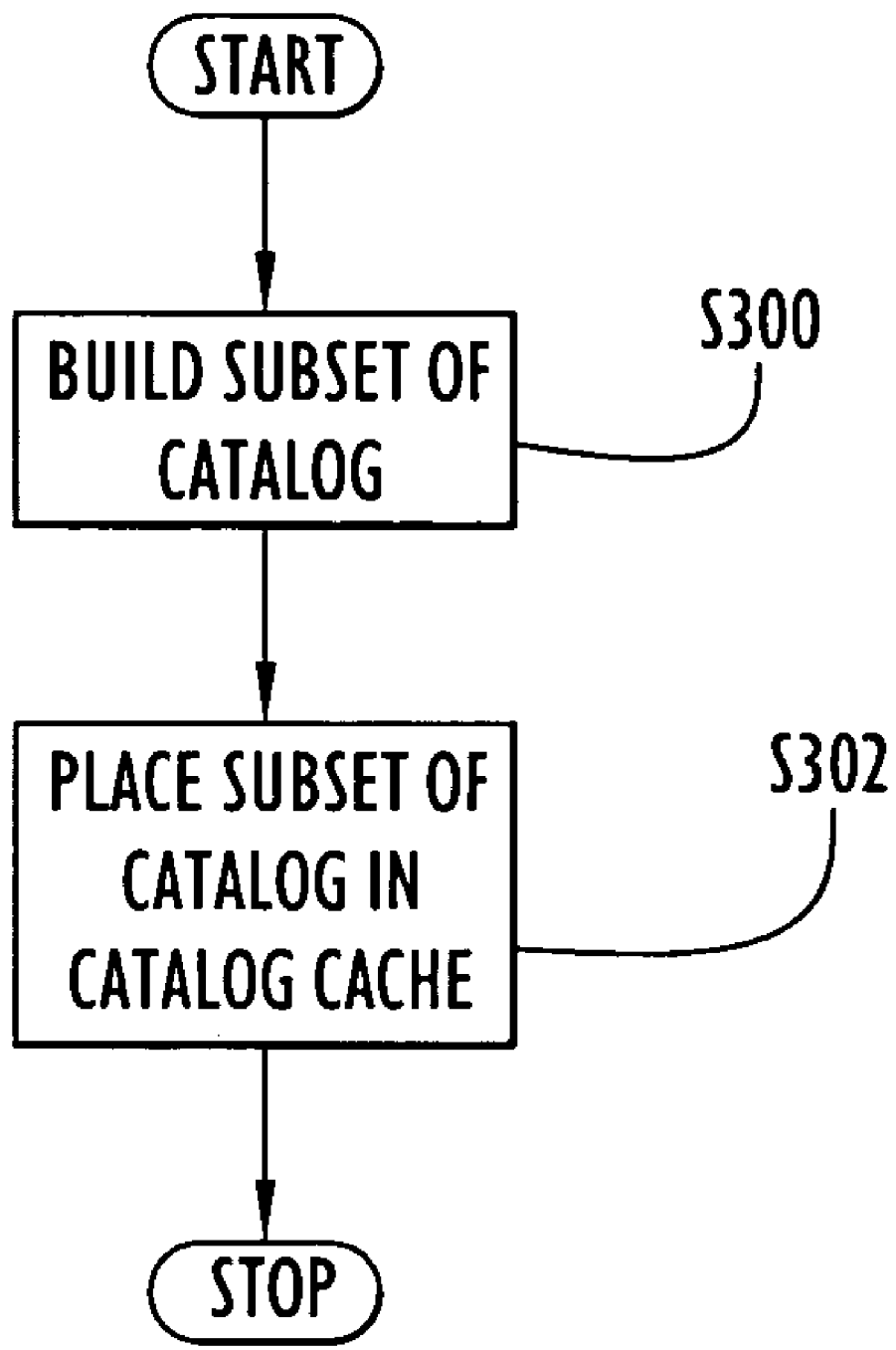
FIG. 3 is a flow diagram that illustrates the operating steps performed by the initialization module of the data processing system of FIG. 2.

FIG. 3 is a flow diagram that illustrates the operating steps performed by the initialization module 228 of FIG. 2 in accordance with the preferred embodiment of the present invention. The first step corresponds to building a subset of the catalog 212 (shown in FIG. 2), the subset identifying the table name and the partition 210N (shown in FIG. 2) that stores the table data [Step S300]. The subset is then loaded into the catalog cache 234 (shown in FIG. 2) [Step S302].

Referring back to FIG. 2, once the appropriate subset of the partition map from the catalog cache 212 has been loaded in the catalog cache 234, the partition router function 232 interrogates the catalog cache 234 in an attempt to determine the subset that corresponds to the target table. Using the partition key value and the subset, the partition router function 232, $F_N$, returns an identifier, Npartition, corresponding to the partition 210N where the desired data is located as shown in the equation below.

$$Npartition = F_N(SQLstatement) \quad\quad S1$$

The partition router function 232 can be implemented based on the internal application program interface (API) provided by a specific RDBMS schema for implementing the partitioned database architecture. A technique commonly employed in the art for partitioning PRDBMS systems is hashing. In the hashing partitioning schema, a hash function is used to determine which partition 210a-210n contains the target data for a given database. The hash function is automatically applied when data are inserted or updated. In order to maintain data location independence, the hashing algorithm used by the PRDBMS module 220 is usually exposed using an RDBMS specific API. Advantageously, the partition router function 232 can be implemented based upon an application program interface (API) in the appropriate programming language as known by a person skilled in the art.

Once the partition 210N containing the data table is identified, the partition identifier Npartition and the interpreted (parsed) SQL statement 227 are passed to the data manager 226. At this stage, the data manager 226 initializes the agent 230N corresponding to the Npartition for the query and establishes a physical connection with the agent 230N. The agent 230N interrogates the corresponding partition 210N to retrieve or access the desired data. The data 211 is then routed to the database application 218 by way of the agent 230N.

Figure 4:
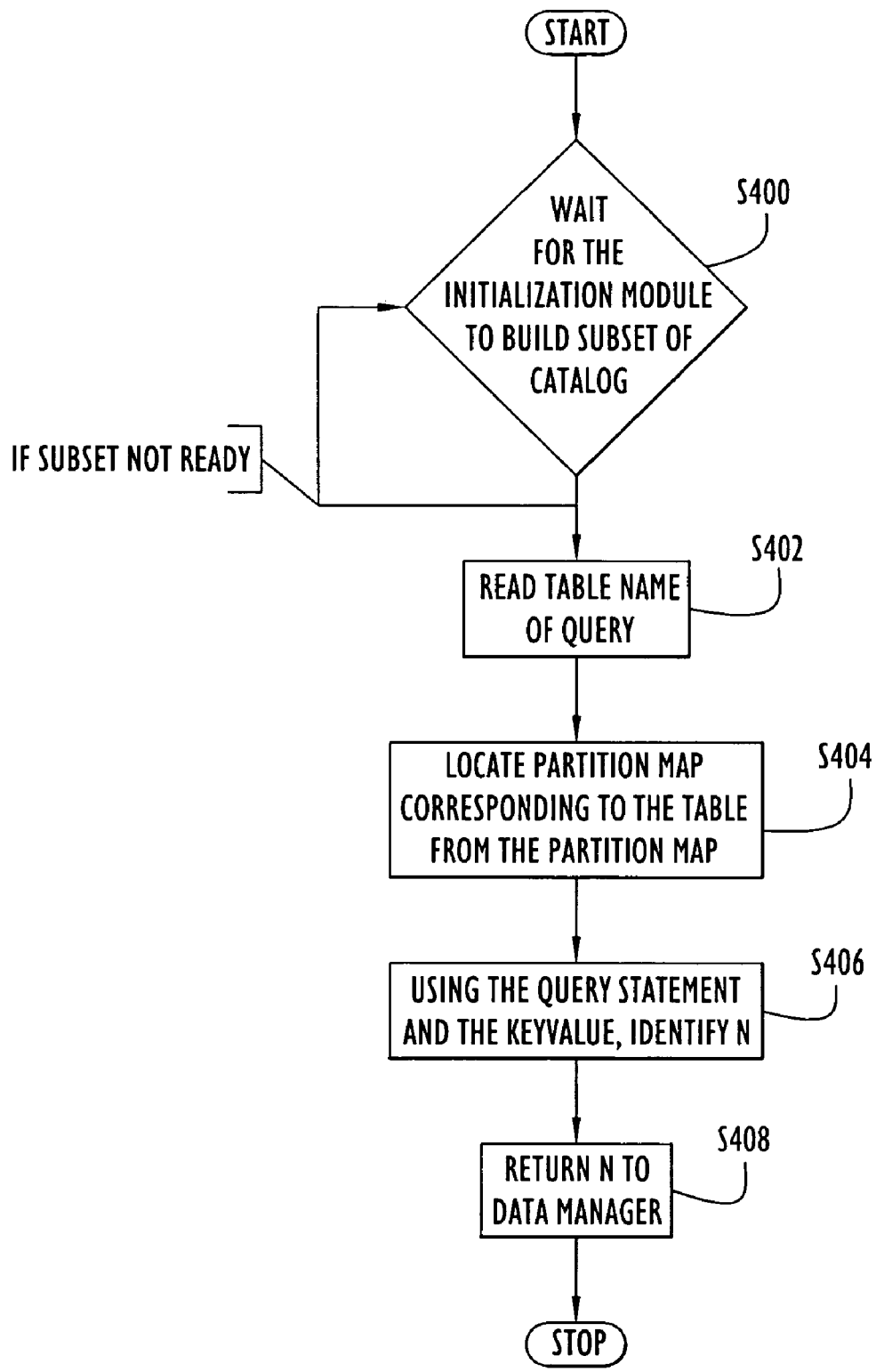
FIG. 4 is a flow diagram that illustrates the operating steps performed by the partition router module of the data processing system of FIG. 2.

FIG. 4 shows the sequence of steps performed by the partition router 224 of FIG. 2. The partition router 224 awaits the initialization module 228 to load a subset of the catalog 212 into the catalog cache 234 [Step S400]. If the subset has been loaded in the catalog cache 234, the partition router 224 reads the table name and the partition key [Step S402] then locates the subset corresponding to the table name [Step S404]. From the located subset and the SQL statement, the partition router function 232 identifies the Npartition for the partition 210N where the desired data resides [Step S406]. The Npartition and the SQL query 227 are then passed to the data manager 226 [Step 408] for data retrieval or access from the target partition 210N.

Based on the foregoing, it can be appreciated that the total processing cost (tc) comprising the number of resource (processing unit, memory or network) accesses required by the SQL query S2 is defined below:

SELECT c1,c2,c3      S2

FROM t1

WHERE c1='abc' can be summarized as follows:

| (tc) Total Cost of application query processing = | |
|---|---|
| (ao) | Invoke $F_N$(SQL Statement) to obtain Npartition (processing unit access + memory access) |
| (a) | + Connection to coordinator node partition, Npartition (processing unit access) |
| (b) | + Coordinator node initialization (processing unit access + memory access) |
| (c) | + Submit SQL statement to agent (processing unit access + network access) |
| (d) | + Consolidate all data for the SQL statement to the coordinator node (processing unit access + network access) |
| (e) | + Retrieve data from the partition (processing unit access + memory access + storage device access) |
| (f) | + Return data to application (network access) |

It will be appreciated that the partition router 224 can eliminate the processing costs associated with extra steps of directing the query to the appropriate partition and transferring data from the data partition to the coordinator typically encountered in the prior systems. Since the cost associated with step (ao) for the present invention is much less than the cost of the extra steps response time can be improved.

Figure 5:
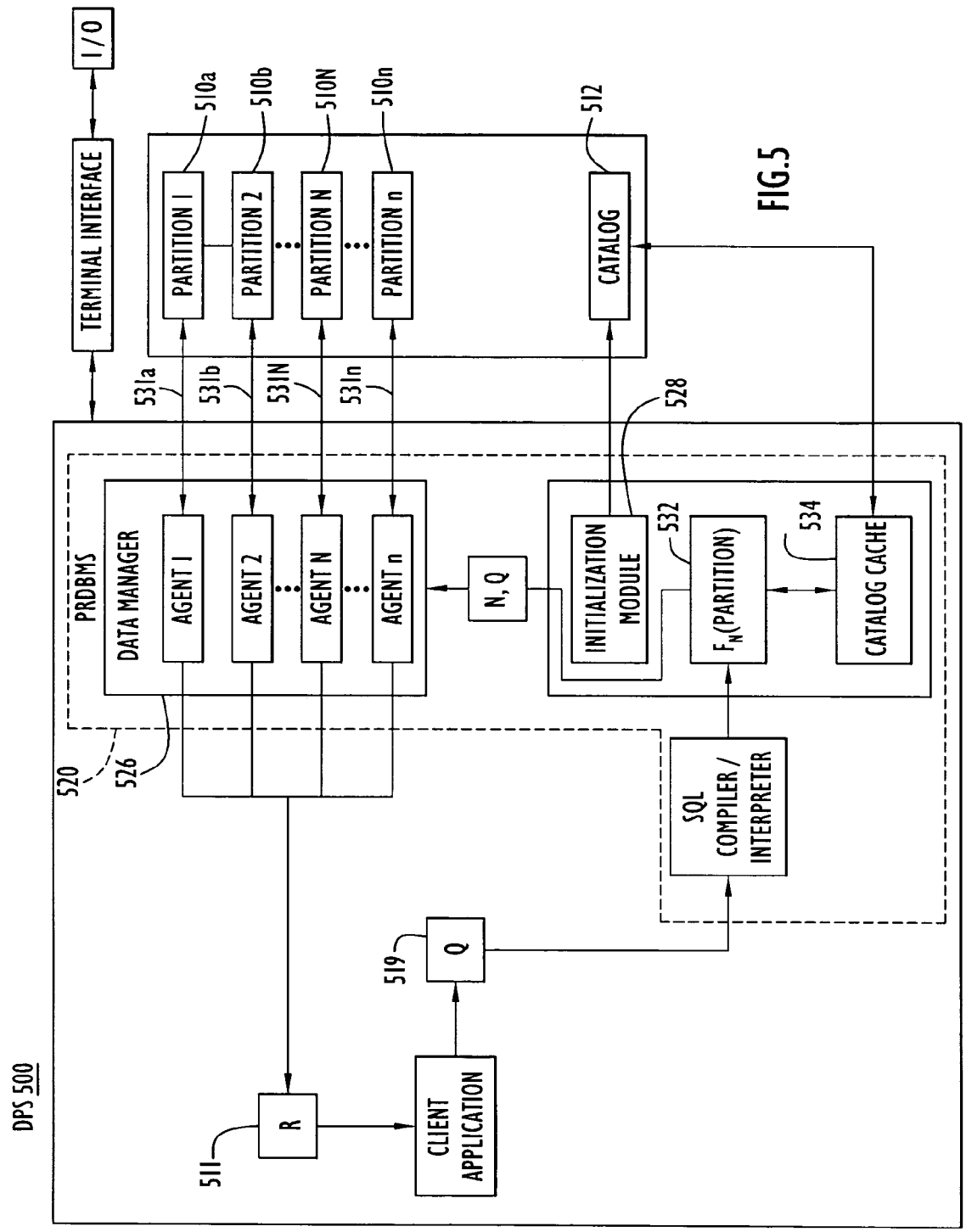
FIG. 5 is a block diagram of the data processing system of FIG. 2 wherein the data manager module of the PRDBMS has persistent connections with database partitions according to another preferred embodiment of the present invention.

Referring now to FIG. 5, there is shown a data processing system 500 similar to data processing system 200 of FIG. 2, except that the data manager 526 of FIG. 5 further includes a pool of persistent physical connections 531a-531n with partitions 510a-510n.

The data manager 526 of FIG. 5 serves to further optimize the SQL statement processing. The data manager 526 is typically a utility program that provides cross-partition connectivity with partitions 510a-510n. The data manager 526 may be implemented as an API by known techniques. In the DB2 environment, data manager 526 may be implemented by the JDBC Data Access API.

The data processing system 500 performs the following sequence of steps to process a database query 519. As a preliminary step, the initialization module 528 builds a subset of the catalog 512 and loads this subset into the catalog cache 534. Once the subset has been loaded, the partition router function 532 uses the table name from the query statement 519 to determine the subset corresponding to the table name in the catalog cache 534. Based on the subset corresponding to the table name in the catalog cache 534 and the SQL query 519, the partition router function 532 resolves a connection reference corresponding to partition Npartition associated with the database query 519. The data manager 526 directly connects to any one or combination of the partitions 510a-510n where the desired data is located and retrieves the desired data via the corresponding persistent connections 531a-531n. Once the requisite data 511 is retrieved, it is directly routed to the database application by way of the persistent connections 531a-531n. Since the cost of finding an available physical connection from the pool is less than the cost of establishing a new connection, the overall system response time is improved.

The present invention may be embodied in other specific forms without departing from the spirit or essential characteristics thereof. Certain adaptations and modifications of the invention will be obvious to those skilled in the art. For instance, the PRDBMS module 220 as shown in FIG. 2 may be integrated in the client application 218 shown in FIG. 2. Similarly, although the preferred embodiments described herein relate to a PRDBMS, the underlying method of the present invention may be equally applicable to a partitioned database system. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

Furthermore, the foregoing detailed description of the embodiments of the present invention does not limit the implementation of the invention to any particular computer programming language. The present invention may be implemented in any computer programming language provided that the OS (Operating System) provides the facilities that may support the requirements of the present invention. Embodiments of the present invention may be implemented in the C or C++, COBOL, FORTRAN, Java or REXX computer programming language (or other computer programming languages in conjunction with C/C++). Any limitations presented would be a result of a particular type of operating system, computer programming language, data processing system, or database management system, and would not be a limitation of the present invention.

What is claimed is:

1. A method for executing a query against a database to retrieve desired data from a database table, wherein the database includes a plurality of partitions coupled by a network for storing different portions of said database table based on a partitioning schema, each partition contained within a corresponding network processing node and associated with a partition identifier, and a database catalog accessible to each of said processing nodes and including information indicating data organization in said database, wherein said database catalog information includes partition maps associating table data with said networked partitions, and wherein a plurality of agent modules of at least one of said network processing nodes are each associated with a corresponding networked partition to establish a physical connection with, execute said query against and retrieve said desired data from that networked partition, the method comprising:

(a) providing a client query, including a table name of said database table containing said desired data and a partition key value, for said database at a network processing node in accordance with a user request to retrieve said desired data and retrieving information within said database catalog and storing the retrieved information in a catalog cache of said network processing node, wherein said retrieved information includes information identifying said table name and at least one networked partition containing said database table wherein step (a) further includes:

building a subset of the database catalog; and storing the subset of the database catalog in the catalog cache;

(b) analyzing the partition key value of the client query and partition map information retrieved from the catalog cache pertaining to said database table with said table name and containing said desired data to determine a specific partition from among said plurality of networked partitions containing the database table portion with the desired data satisfying said client query and identifying a partition identifier associated with the specific partition; and (c) executing the client query against said specific partition by determining said associated agent module for said specific partition based on said partition identifier and directing said determined agent module to execute said client query against, and retrieve said desired data satisfying said client query from, said specific partition.

2. The method of claim 1, wherein step (b) further includes:
(b.1) resolving the partition identifier.

3. The method of claim 1, wherein step (c) further includes:
(c.1) forwarding the retrieved data to a client application requesting table data.

* * * * *